United States Patent
Gourdon et al.

(10) Patent No.: US 12,527,336 B2
(45) Date of Patent: Jan. 20, 2026

(54) PALATABILITY-ENHANCING COMPOSITION

(71) Applicant: SPECIALITES PET FOOD, Elven (FR)

(72) Inventors: Isabelle Gourdon, Saint Nolff (FR); Aurélie De Ratuld, Ploeren (FR)

(73) Assignee: SPECIALITES PET FOOD, Elven (FR)

( * ) Notice: Subject to any disclaimer, the term of this patent is extended or adjusted under 35 U.S.C. 154(b) by 172 days.

(21) Appl. No.: 18/288,766

(22) PCT Filed: Apr. 29, 2022

(86) PCT No.: PCT/EP2022/061531
§ 371 (c)(1),
(2) Date: Oct. 27, 2023

(87) PCT Pub. No.: WO2022/229411
PCT Pub. Date: Nov. 3, 2022

(65) Prior Publication Data
US 2024/0206498 A1 Jun. 27, 2024

(30) Foreign Application Priority Data

Apr. 30, 2021 (EP) .................. 21305564

(51) Int. Cl.
*A23K 20/26* (2016.01)
*A23K 40/30* (2016.01)
*A23K 50/40* (2016.01)

(52) U.S. Cl.
CPC .............. *A23K 20/26* (2016.05); *A23K 40/30* (2016.05); *A23K 50/40* (2016.05)

(58) Field of Classification Search
CPC ........ A23K 20/26; A23K 40/30; A23K 50/40; A23K 20/158; A23K 20/163; A23K 20/142
See application file for complete search history.

(56) References Cited

U.S. PATENT DOCUMENTS

| | | |
|---|---|---|
| 5,186,964 A | 2/1993 | Gierhart et al. |
| 6,254,920 B1 | 7/2001 | Brunner |
| 6,350,485 B2 | 2/2002 | Brunner |
| 7,186,437 B2 | 3/2007 | Guiller et al. |
| 2004/0247741 A1 | 12/2004 | Guiller et al. |
| 2005/0037108 A1 | 2/2005 | Lin et al. |
| 2009/0098267 A1 | 4/2009 | Pettelot et al. |
| 2014/0227386 A1 | 8/2014 | Niceron et al. |
| 2017/0112167 A1 | 4/2017 | Cambou et al. |

OTHER PUBLICATIONS

Hubbard, "Trisodium Monohydrogen Pyrophosphate and Its Hydrates," Industrial and Engineering Chemistry, vol. 41, No. 12, Dec. 1949, pp. 2908-2911.
Ivashkevich et al., "The crystal structure of Na3HP2O7 H2O from X-ray powder diffraction data," Z. Kristallogr., vol. 217, 2002, pp. 73-77.
Louer et al., "Some further considerations in powder diffractions pattern indexing with the dichotomy method," Powder Diffraction, vol. 29, Dec. 2014, pp. S7-S12.

*Primary Examiner* — Emily M Le
*Assistant Examiner* — Carrie Glimm
(74) *Attorney, Agent, or Firm* — Birch, Stewart, Kolasch & Birch, LLP

(57) ABSTRACT

The present invention relates to a palatability-enhancing composition comprising at least one trisodium pyrophosphate containing a crystalline phase, wherein said crystalline phase comprises a monohydrate phase and an anhydrous phase in a monohydrate phase/anhydrous phase weight ratio between 1:50 and 4:1.

16 Claims, No Drawings

PALATABILITY-ENHANCING COMPOSITION

The present invention relates to the field of pet food.

More precisely, the present invention concerns a palatability-enhancing composition comprising at least one trisodium pyrophosphate containing a crystalline phase, wherein said crystalline phase comprises a monohydrate phase and an anhydrous phase in a weight ratio monohydrate phase/anhydrous phase between 1:50 and 4:1.

BACKGROUND OF THE INVENTION

Pets are well taken care of by their owners which provide them a proper selection of foods. Those foods include not only pets' usual nutritionally-balanced diet, but also supplements, treats, and toys. Pets, like humans, are attracted to and eat more regularly and easily foods which they find palatable.

To this end, palatability-enhancing compositions play a key role in improving the stimulation of animal's taste and/or olfactory system. Powdered or liquid palatability-enhancing compositions provide pet foods with aroma and taste which appeal to pets. These palatability-enhancing compositions are commonly coated onto kibbles (or other dry pet foods) in order to stay as accessible as possible to animal's nose and tongue. Palatability-enhancing compositions can also be added by inclusion into kibbles, and they are often added to semi-moist or even canned pet foods as well.

Today, almost all palatability-enhancing compositions intended for cats comprise inorganic phosphate compounds. Indeed, it has been largely demonstrated that inorganic phosphate compounds very significantly enhance food palatability to cats. As examples, disodium pyrophosphate (U.S. Pat. No. 5,186,964), trisodium pyrophosphate (U.S. Pat. No. 7,186,437), and tetrasodium or tetrapotassium pyrophosphate (U.S. Pat. Nos. 6,254,920; 6,350,485; US 2005/0037108) are commonly used to this end.

Structurally, trisodium pyrophosphate ($Na_3HP_2O_7$) is made of two distinctive phases, an amorphous phase which corresponds to the phase wherein molecules are not arranged and a crystalline phase which corresponds to the phase wherein molecules are properly arranged in a three-dimensional manner. Crystallography analysis allows to precisely study the content of the crystalline phase, and notably to differentiate between anhydrous trisodium pyrophosphate and monohydrate trisodium pyrophosphate.

Until now, two forms of trisodium pyrophosphate compounds are commercialized and used in palatability-enhancing compositions intended for cat's consumption, with varying structural water contents within their crystalline phase: anhydrous trisodium pyrophosphate ($Na_3HP_2O_7$) and monohydrate trisodium pyrophosphate ($Na_3HP_2O_7$—$H_2O$). These two commonly used trisodium pyrophosphates are constituted of only one phase within the crystalline phase, either an anhydrous phase or a monohydrate phase, respectively.

For the first time, the present inventors have demonstrated that selecting trisodium pyrophosphate compounds comprising a crystalline phase made of a mix of monohydrate phase and anhydrous phase in very specific proportions enables to significantly improve pet palatability performance.

SUMMARY

In a first aspect, the present invention relates to a palatability-enhancing composition comprising at least one trisodium pyrophosphate containing a crystalline phase, wherein said crystalline phase comprises a monohydrate phase and an anhydrous phase in a weight ratio monohydrate phase/anhydrous phase between 1:50 and 4:1.

In another aspect, the present invention relates to a pet food comprising the palatability-enhancing composition according to the invention.

Another aspect of the present invention relates to a method for preparing said palatability-enhancing composition.

Another aspect of the present invention relates to a method for enhancing the palatability of a pet food.

Another aspect of the invention relates to a method for producing a pet food.

Another aspect of the present invention relates to the use of at least one trisodium pyrophosphate containing a crystalline phase, wherein said crystalline phase comprises a monohydrate phase and an anhydrous phase in a weight ratio monohydrate phase/anhydrous phase between 1:50 and 4:1, for enhancing palatability of a pet food.

DESCRIPTION OF SOME EMBODIMENTS OF THE INVENTION

General Definitions

Unless specifically stated otherwise, percentages are expressed herein by weight of a product reference. In the present disclosure, ranges are stated in shorthand, so as to avoid having to set out at length and describe each and every value within the range. Any appropriate value within the range can be selected, where appropriate, as the upper value, lower value, or the terminus of the range. For example, a range of 0.1-1.0 represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc.

Depending on embodiments, it is herein disclosed either an upper value or a lower value or a range of values. It has to be understood that any lower value disclosed for an entity in an embodiment can be combined to any upper value disclosed for the same entity in another embodiment, so as to obtain one or more other embodiments defined by one or more ranges of values, respectively. In other words, as far as one or more upper values are disclosed with respect to an entity in some embodiments and as one or more lower values are further disclosed with respect to the same entity in other embodiments, it is herein also clearly and unambiguously disclosed any range of values, from said one or more lower values up to said one or more upper values, with respect to said entity.

As used throughout, the singular form of a word includes the plural, and vice versa, unless the context clearly dictates otherwise. Thus, the references "a", "an", and "the" are generally inclusive of the plurals of the respective terms. For example, reference to "a method" includes a plurality of such "methods". Similarly, the words "comprise", "comprises", and "comprising" are to be interpreted inclusively. Likewise, the terms "include", "including" and "or" should all be construed to be inclusive. All these terms however have to be considered as encompassing exclusive embodiments that may also be referred to using words such as "consist of".

The methods and compositions and other embodiments exemplified here are not limited to the particular methodologies, protocols, and reagents that are described herein because, as the skilled artisan will appreciate, they may vary.

Unless specifically defined, all technical and scientific terms used herein have the same meaning as commonly understood by a skill artisan in chemistry, biochemistry, cellular biology, molecular biology, and agronomy.

The term "about" as used herein when referring to a measurable value such as an amount, a temporal duration, and the like, is meant to encompass variations of ±20%, more preferably ±10%, even more preferably ±5% from the specified value, as such variations are appropriate to reproduce the disclosed methods and products.

"Pet" refers to any domesticated animal including, without Limitation, cats, dogs, rabbits, guinea pigs, ferrets, hamsters, mice, gerbils, birds, horses, cows, goats, sheep, donkeys, pigs, some fish species, and the like. In the context of the present invention, pets such as dogs and cats are preferred, and even more particularly cats. However, although the present disclosure is focused on cats, the invention can be adapted for use with other classes of companion animals. If desired, the invention can be tested to evaluate its suitability for use with different classes of animals that may be considered as companion animals.

In the following description, embodiments may be taken alone or combined in an appropriate manner by the skilled person.

Palatability-Enhancing Compositions

The present inventors showed for the first time that selecting particular trisodium pyrophosphates having specific physicochemical characteristics provides a significant gain in enhancing palatability to pet foods containing same. Of note, pet food palatability is all the more enhanced when both an anhydrous phase and a monohydrate phase coexist in specific proportions in the crystalline phase of trisodium pyrophosphates. The pet foods comprising such trisodium pyrophosphates are more appreciated than pet foods containing standard trisodium pyrophosphates, which are generally formed of only one phase within the crystalline phase, either a monohydrate phase or an anhydrous phase.

In a first aspect, the invention relates to a palatability-enhancing composition comprising at least one trisodium pyrophosphate containing a crystalline phase, wherein said crystalline phase comprises a monohydrate phase and an anhydrous phase in a weight ratio monohydrate phase/anhydrous phase between 1:50 and 4:1 (based on the total weight of said crystalline phase).

A trisodium pyrophosphate containing a crystalline phase, wherein said crystalline phase comprises a monohydrate phase and an anhydrous phase in a weight ratio monohydrate phase/anhydrous phase between 1:50 and 4:1 (based on the total weight of said crystalline phase), is referred to herein as "a trisodium pyrophosphate as defined in the present invention".

As used herein, the term "palatability" refers to the overall willingness of a pet to eat a certain pet food and be satisfied by that food. Whenever a pet shows a preference, for example, for one of two or more pet foods, the preferred pet food is more "palatable", and has "enhanced palatability". Different methods exist to assess palatability. Examples of such methods involve exposure of pets to pet foods either simultaneously (for example, in side-by-side, free-choice comparisons, e.g., by measuring relative consumption of at least two different pet foods in a so-called "two-bowl" test), or sequentially (e.g., using single bowl testing methodologies). It can advantageously be determined by at least a "two-bowl test" or "versus test" in which the animal has equal access to both compositions. Advantageously, expert panels of pets are used in order to guarantee repeatable and fine measurement of palatability performance for pet food products.

Therefore, the invention more particularly relates to a palatability-enhancing composition for pets, in particular for cats.

The inventors surprisingly showed that the crystalline monohydrate phase and the crystalline anhydrous phase of the trisodium pyrophosphate as defined in the present invention must be in a monohydrate phase/anhydrous phase weight ratio between 1:50 and 4:1 (based on the total weight of the crystalline phase) to enhance the palatability of food to animals, especially cats.

In a particular embodiment, the crystalline monohydrate phase and the crystalline anhydrous phase of the trisodium pyrophosphate as defined in the present invention are in a monohydrate phase/anhydrous phase weight ratio of at least 1:40, or at least 1:30, or at least 1:20, or at least 1:19 (based on the total weight of said crystalline phase).

In a particular embodiment, the crystalline monohydrate phase and the crystalline anhydrous phase of the trisodium pyrophosphate as defined in the present invention are in a monohydrate phase/anhydrous phase weight ratio of less than 3:1 (based on the total weight of said crystalline phase).

In a particular embodiment, the crystalline monohydrate phase and the crystalline anhydrous phase of the trisodium pyrophosphate as defined in the present invention are in a monohydrate phase/anhydrous phase weight ratio between 1:40 and 4:1, or between 1:30 and 4:1, or between 1:20 and 4:1, or between 1:20 and 3:1, or between 1:19 and 3:1 (based on the total weight of said crystalline phase).

In a particular embodiment, the crystalline phase of the trisodium pyrophosphate as defined in the present invention comprises at least 20%, or at least 25%, or at least 30% by weight of said anhydrous phase (% based on the total weight of said crystalline phase).

In a particular embodiment, the crystalline phase of the trisodium pyrophosphate as defined in the present invention comprises less than 98%, or less than 97%, or less than 95% by weight of said anhydrous phase (% based on the total weight of said crystalline phase).

In a particular embodiment, the trisodium pyrophosphate as defined in the present invention comprises at least 15%, or at least 18%, or at least 20% by weight of said anhydrous phase (% based on the total weight of said trisodium pyrophosphate).

In a particular embodiment, the trisodium pyrophosphate as defined in the present invention comprises less than 95%, or less than 90%, or less than 80%, or less than 70% by weight of said anhydrous phase (% based on the total weight of said trisodium pyrophosphate).

In a particular embodiment, the crystalline phase of the trisodium pyrophosphate as defined in the present invention comprises at least 2%, or at least 3%, or at least 5% by weight of said monohydrate phase (% based on the total weight of said crystalline phase).

In a particular embodiment, the crystalline phase of the trisodium pyrophosphate as defined in the present invention comprises less than 80%, or less than 75%, or less than 70% by weight of said monohydrate phase (% based on the total weight of said crystalline phase).

In a particular embodiment, the trisodium pyrophosphate as defined in the present invention comprises at least 1.5%, or at least 2%, or at least 3%, or at least 5% by weight of said monohydrate phase (% based on the total weight of said trisodium pyrophosphate).

In a particular embodiment, the trisodium pyrophosphate as defined in the present invention comprises less than 80%, or less than 75%, or less than 70% by weight of said monohydrate phase (% based on the total weight of said trisodium pyrophosphate).

The trisodium pyrophosphate as defined in the present invention contains preferably at least 80%, more preferably at least 82%, more preferably at least 83%, more preferably at least 84%, more preferably at least 85% by weight of said crystalline phase according to the invention (% based on the total weight of said trisodium pyrophosphate).

In a particular embodiment, the trisodium pyrophosphate as defined in the present invention is composed of less than 99%, or less than 98%, or less than 97%, or less than 95% by weight of said crystalline phase (% based on the total weight of said trisodium pyrophosphate).

Typically, the trisodium pyrophosphate as defined in the present invention also contains an amorphous phase (and is thus constituted of two phases: a crystalline phase and an amorphous phase). The crystalline phase and the amorphous phase differ in the physical arrangement of particles which form repeating patterns in the crystalline phase and which are not arranged at all in the amorphous phase.

In a particular embodiment, the trisodium pyrophosphate as defined in the present invention is composed of at least 1%, or at least 2%, or at least 3%, or at least 4%, or at least 5% by weight of said amorphous phase (% based on the total weight of said trisodium pyrophosphate).

In a particular embodiment, the trisodium pyrophosphate as defined in the present invention is composed of less 20%, or less than 15% by weight of said amorphous phase (% based on the total weight of said trisodium pyrophosphate).

The identification of the physical characteristics of trisodium pyrophosphates may be determined using various analytical methods. An X-ray diffractometer can be used to identify the crystalline phase. The height of the lines on the X-ray diffraction pattern may be used to determine the amount of crystalline phase (and more precisely of anhydrous phase, monohydrate phase, etc.), and consequently the amount of amorphous phase, by using the conventional Rietveld refinement method.

The trisodium pyrophosphate as defined in the present invention is generally prepared in powder form.

According to this embodiment, it is additionally preferred that the trisodium pyrophosphate as defined in the present invention contains particles in powder form having a particle size of less than 300 μm, preferably between 2 and 300 μm. It is understood that with respect to the preferred particle sizes as given above, at least 80%, preferably at least 90%, more preferably at least 95% and most preferably at least 98% by weight of the particles have the specified size.

The palatability-enhancing composition of the present invention can be liquid or dry.

In a particular embodiment, the palatability-enhancing composition of the present invention is liquid. By "liquid", it is here understood that it has a moisture content of at least about 40%, preferably at least about 50%, preferably at least about 60%, preferably at least about 65%, preferably at least about 70%, preferably at least about 75%, preferably at least about 80%, by weight of the palatability-enhancing composition.

In another particular embodiment, the palatability-enhancing composition of the present invention is dry. By "dry", it is here understood that it has a moisture content of less than or equal to about 10%, preferably from about 1 to about 8%, by weight of the palatability-enhancing composition.

In a particular embodiment, the palatability-enhancing composition of the present invention comprises at least about 2%, more preferably at least about 3%, more preferably at least about 4%, more preferably at least about 5%, more preferably at least about 6%, more preferably at least about 7%, more preferably at least about 8%, more preferably at least about 10% by weight of trisodium pyrophosphate as defined in the present invention (% based on total weight of said palatability-enhancing composition). Preferably, the palatability-enhancing composition of the present invention comprises up to about 50%, more preferably up to about 40%, more preferably up to about 30% by weight of trisodium pyrophosphate as defined in the present invention (% based on total weight of said palatability-enhancing composition).

The palatability-enhancing composition of the invention can further comprise at least one additional ingredient. Preferably, said at least one additional ingredient further enhances palatability and is for example selected from protein hydrolysates, amino acids, sugars, fats, and yeasts.

A "protein hydrolysate" is made from all conventional protein sources that are compatible for animal consumption, especially sources of plant proteins (such as vegetable, roots, tubers, stems, grains) (hereafter named "plant protein hydrolysate"), sources of animal proteins (such as poultry, pork, beef, sheep, lamb, milk, eggs) (hereafter named "animal protein hydrolysate"), sources of marine proteins (hereafter named "marine protein hydrolysate") and sources of single cell proteins (e.g., algae, bacteria, yeast) (hereafter named "single cell protein hydrolysate"). The source of proteins has been chemically and/or enzymatically hydrolyzed, for example by a protease or by a lipase, or by autolysis.

"Sugars" include monosaccharides, disaccharides or oligosaccharides (including hydrolysis products of disaccharides and/or of oligosaccharides), and more particularly reducing sugars that can provide a free or available carbonyl group. These reducing sugars can take part in Maillard reactions with amino acids or peptides. Examples of reducing sugars include xylose, arabinose, ribose, glucose, fructose, mannose, galactose, rhamnose, lactose, maltose, raffinose.

The term "yeast" herein refers to any yeast, preferably inactive, as well as to yeast by-products that are compatible with compositions for animal consumption. Yeasts include, without limitation, brewer's yeast, baker's yeast, torula yeast, molasses yeast, and the like. Yeast by-products include, without limitation, yeast extracts, yeast hydrolysates, cream yeasts, yeast autolysates, etc.

The term "amino acids" refers to free amino acids, i.e. amino acids that are individually present as unbound ingredients in a composition or that result from raw materials hydrolysis/autolysis. Free amino acids do not form part or are not contained into peptides or proteins and are not joined to other amino acids by peptide bonds. Intermediates, degradation products or homologues of amino acids (such as homocysteine, cystathionine, cysteamine, and the like) are preferably also encompassed by the term "amino acid".

Examples of fats include tallow, oils, from any origin such as animal (such as poultry fat, chicken fat, pork fat, milk-derived fat, beef tallow or lamb tallow and the like, as well as by-products thereof), plant (including vegetable), or marine oils.

In a particular embodiment, the palatability-enhancing composition of the invention further comprises at least one protein hydrolysate, such as a plant protein hydrolysate, an animal protein hydrolysate, a marine protein hydrolysate or a single cell protein hydrolysate. In a preferred embodiment, the palatability-enhancing composition of the invention further comprises at least one animal protein hydrolysate, such as a poultry protein hydrolysate or a pork protein hydrolysate.

In a particular embodiment, the palatability-enhancing composition of the invention consists of at least one trisodium pyrophosphate as defined in the present invention.

Method for Preparing a Palatability-Enhancing Composition

Another aspect of the present invention concerns a method for preparing a palatability-enhancing composition comprising:
- a) providing at least one trisodium pyrophosphate as defined in the present invention;
- b) providing one or more additional ingredient(s), preferably at least sources of proteins, amino acids, sugars, fats, and yeasts;
- c) optionally hydrolyzing said one or more additional ingredient(s);
- d) adding said at least one trisodium pyrophosphate to said one or more additional ingredient(s), thereby obtaining said palatability-enhancing composition.

In a particular embodiment, said method comprises a step a1) before step a), said step a1) consisting of preparing said at least one trisodium pyrophosphate as defined in the present invention. This method for preparing the trisodium pyrophosphate as defined in the present invention is not particularly limited as long as crystalline monohydrate phase and crystalline anhydrous phase can be obtained in a monohydrate phase/anhydrous phase weight ratio between 1:50 and 4:1.

For example, in order to obtain the specific, hereindescribed physicochemical characteristics of the trisodium pyrophosphate, the proportions of the anhydrous crystalline phase and the monohydrate crystalline phase may be controlled by varying the process for preparing trisodium pyrophosphate and/or the method for storing said trisodium pyrophosphate. For example, the storage temperature and/or the humidity and/or the storage time can affect these ratios. The skilled person is able to readily monitor the crystalline phase proportions using techniques above disclosed, in particular X-ray diffractometry.

In a preferred embodiment, at least one source of proteins is provided in step b). In a preferred embodiment, at least one animal protein hydrolysate is provided in step b), such as a poultry protein hydrolysate or a pork protein hydrolysate.

Preferably, step c) (hydrolysis) is performed. Said step c) can comprise a step of contacting the ingredients with at least one enzyme and allowing said enzyme to hydrolyze said one or more additional ingredient(s). Under these circumstances, said one or more additional ingredients comprise at least a source of proteins and/or a fat, more preferably at least source of proteins.

For example, hydrolysis is performed at a temperature ranging from about 50° C. to about 200° C. For example, hydrolysis is performed during a period of time which can range from about 5 min to about 5 hours. These parameters are appropriate under standard atmospheric conditions of temperature and pressure. However, the skilled person will be able to adapt these parameters under other conditions.

An enzyme used for this hydrolysis step c) can be a protease and/or a lipase. Preferably, at least a protease is used.

Of course, other additional ingredients, such as nutrients (such as vitamins, minerals, electrolytes), anti-oxidants, preservatives, texturing agents (such as xanthan, alginate, carragheenans, guar gum, arabic gum) and/or carriers (such as maltodextrins), can be added before and/or after step c) of hydrolysis.

The method as above described can comprise an additional step of drying the palatability-enhancing composition after step c) or step d). Drying step is routine work for the skilled artisan. Typically, drying is performed so as to remove any excess water. In particular, the resulting water content is less than or equal to about 10%, preferably from about 1 to about 8%, by weight of the thus obtained palatability-enhancing composition.

In an embodiment, the method as above described comprises after step b) or step c) the additional steps of:
- c1) combining the one or more additional ingredient(s) resulting from step b) or c) with carriers (such as maltodextrins) in appropriate proportions; and/or
- c2) drying the resulting product, for example by evaporation, at an appropriate temperature, thereby obtaining a dry composition (to which the trisodium pyrophosphate as defined in the present invention can be added in step d)).

In a particular embodiment, said at least one trisodium pyrophosphate as defined in the present invention is incorporated in step d) in an amount of at least about 2%, more preferably at least about 3%, more preferably at least about 4%, more preferably at least about 5%, more preferably at least about 6%, more preferably at least about 7%, more preferably at least about 8%, more preferably at least about 10% (% based on total weight of said palatability-enhancing composition) and/or up to about 50%, more preferably up to about 40%, more preferably up to about 30% by (% based on total weight of said palatability-enhancing composition).

The person skilled in the art will be able to select appropriate steps, adapt said steps if need be, select appropriate order for performing the selected steps, given that some steps may be performed concomitantly according to usual practice in the art.

An object of the present invention relates to a palatability-enhancing composition obtained by a method as above described.

Pet Food Comprising the Palatability-Enhancing Composition

Another aspect of the invention consists in a pet food comprising the palatability-enhancing composition as above described.

The pet food can be a nutritionally-balanced pet food, a pet food supplement, a medicament, a treat, a toy (chewable and/or consumable toys), a drink or a beverage. In a particular embodiment, the pet food is a nutritionally-balanced pet food.

A "nutritionally-balanced" (or "nutritionally-complete" or "complete and nutritionally-balanced") pet food is one that contains all known required nutrients for the intended recipient or consumer of the food, in appropriate amounts and proportions based, for example, on recommendations of recognized or competent authorities in the field of companion animal nutrition (such as AAFCO). Such pet foods are therefore capable of serving as a sole source of dietary intake to maintain life, without the addition of supplemental nutritional sources. Food supplements, treats, toys, drinks and beverages are not encompassed within the terms "nutritionally-balanced pet foods".

Typically, there are three main categories or classes of nutritionally-balanced pet foods depending on their moisture content, which is either low or medium or high:
- dry pet foods (having less than about 14% moisture), such as dry kibbles;

semi-moist or semi-dry pet foods (having from about 14 to about 50% moisture);

canned or wet pet foods (having more than about 50% moisture), such as loafs (terrines, pates, mousses, and the like), chunk-in-"X" products (chunks in a "X" preparation, such as chunk-in-jelly products, chunk-in-gravy products, and the like).

Medicaments (for pets) and pet supplements may be in any form, e.g., solid, liquid, gel, tablets, capsules, powder, and the like. Palatability-enhancing compositions can be used to improve palatability of medicaments and pet supplements in the same manner as they are used to improve palatability of other pet foods.

In a particular embodiment, said pet food is a solid pet food. A "solid pet food" is one that has less than about 50% moisture, and can be a dry pet food, a semi-moist pet food, a pet supplement, a medicament, a treat or a toy, and more preferably a dry pet food, in particular a dry kibble. Preferably for this particular embodiment, the palatability-enhancing composition of the invention is comprised in a coating on the solid pet food.

In another particular embodiment, the pet food is a wet pet food, in particular a chunk-in-"X" product or loaf. Importantly, although the description herein refers mainly to kibbles and other solid pet foods, it should be understood that the palatability-enhancing composition of the invention can also be used with wet pet food.

The pet food according to the present invention can comprise pet food ingredients such as proteins, peptides, amino acids, grains, carbohydrates, fats or lipids, flavours, additives. The food balance, including the relative proportions of vitamins, minerals, lipids, proteins, and carbohydrates, is determined according to the known dietary standards in the veterinary field, for example by following recommendations of the National Research council (NRC), or the guidelines of the American Association of Feed Control Officials (AAFCO).

In a particular embodiment, said pet food comprises at least 0.2%, at least 0.5%, at least 1%, at least 2%, at least 3%, at least 4%, at least 5% by weight of said palatability-enhancing composition, based on the total weight of said pet food.

Said pet food can comprise less than 50%, preferably less than 40%, more preferably less than 30%, more preferably less than 20%, more preferably less than 10%, more preferably less than 5% by weight of said palatability-enhancing composition (% based on the total weight of said pet food).

In a particular embodiment, the at least one trisodium pyrophosphate as defined in the present invention is in an amount of at least 0.01%, preferably at least 0.05%, more preferably at least 0.1% by weight of said pet food.

In a particular embodiment, the at least one trisodium pyrophosphate as defined in the present invention is in an amount of less than 3%, preferably less than 2%, more preferably less than 1.5%, more preferably less than 1%, more preferably less than 0.9%, more preferably less than 0.8% by weight of said pet food.

In a particular embodiment, the at least one trisodium pyrophosphate as defined in the present invention is in an amount of between 0.1% and 0.5% by weight of said pet food.

The palatability-enhancing composition as above described is preferably comprised in a coating on the pet food. The palatability-enhancing composition as above described can also be included in the pet food.

In an embodiment, the pet food of the present invention is a cat food.

The present invention also concerns a pet food comprising at least one trisodium pyrophosphate as defined in the present invention, more particularly containing a crystalline phase, wherein said crystalline phase comprises a monohydrate phase and an anhydrous phase in a weight ratio monohydrate phase/anhydrous phase between 1:50 and 4:1.

Of course, the above-mentioned technical features recited for the trisodium pyrophosphate as defined in the present invention apply herein as well as all along the present disclosure.

Method for Producing a Pet Food

Another aspect of the present invention concerns a method for producing a pet food, preferably a cat food, wherein said method comprises:
 a) providing a pet food,
 b) adding to a pet food a palatability-enhancing composition as above described.

Said method can comprise a step a1) before step a) of preparing a pet food. Pet foods can commonly be prepared by different methods known by the skilled person.

Step b) can be performed by adding the palatability-enhancing composition of the invention to a pet food either by coating or by inclusion. In a particular embodiment, step b) is performed by adding the palatability-enhancing composition of the present invention to a pet food by coating.

For example, one can cite a method for coating solid pet foods, such as dry pet foods, and more particularly dry kibbles. Uncoated kibbles can be placed in a container such as a tub or a coating drum for mixing. The palatability-enhancing composition of the present invention may then be applied, as either a liquid or a powder. A fat can previously be sprayed onto dry kibbles. Alternatively, a fat and the palatability-enhancing composition of the invention can be mixed and applied concurrently.

Alternatively, the palatability-enhancing composition of the invention can be incorporated or included into a solid pet food, such as dry pet food, and more particularly a dry kibble, according to the following illustrative method. The palatability-enhancing composition of the invention is typically contacted with the raw ingredients of the pet food preparation prior to cooking. For example, the palatability-enhancing composition of the invention is combined to proteins, fibre, carbohydrates and/or starch, etc., of the pet food preparation and is cooked with those materials in the cooker-extruder.

Inclusion into wet pet foods can be achieved as follows. The palatability-enhancing composition of the invention can be applied in a gravy- or jelly-type matrix during the blending process in addition to the other pet food ingredients. The palatability-enhancing composition of the invention can also be applied into a meat-by mixtures for chunks or loaf preparation. In this case, it can be added to raw materials before or after the grinding process. The meat-by mixture may be cooked in a steam or grilling oven in the case of chunks manufacturing, or directly sealed in cans in the case of loaf manufacturing.

Of course, the above-mentioned technical features recited for both the palatability-enhancing composition and the pet food according to the present invention can also apply to this method.

Methods and Uses for Enhancing the Palatability of a Pet Food/Increasing Pet Food Intake Yet another aspect of the present invention is related to a method for enhancing the palatability of a pet food, wherein said method comprises:
 a) providing a pet food,
 b) adding to a pet food a palatability-enhancing composition as above described.

The invention also relates to the use of a palatability-enhancing composition as above described for enhancing palatability of a pet food.

The invention also relates to the use of at least one trisodium pyrophosphate as defined in the present invention, more particularly containing a crystalline phase, wherein said crystalline phase comprises a monohydrate phase and an anhydrous phase in a weight ratio monohydrate phase/anhydrous phase between 1:50 and 4:1, for enhancing palatability of a pet food.

The invention also relates to the use of at least one trisodium pyrophosphate as defined in the present invention, more particularly containing a crystalline phase, wherein said crystalline phase comprises a monohydrate phase and an anhydrous phase in a weight ratio monohydrate phase/anhydrous phase between 1:50 and 4:1, as a pet food palatability-enhancer.

The invention also relates to the use of at least one trisodium pyrophosphate as defined in the present invention, more particularly containing a crystalline phase, wherein said crystalline phase comprises a monohydrate phase and an anhydrous phase in a weight ratio monohydrate phase/anhydrous phase between 1:50 and 4:1, for the manufacture of a pet food palatability-enhancing composition.

Regarding these methods and uses, palatability of the pet food is enhanced compared to another pet food which does not comprise a palatability-enhancing composition according to the invention, in particular which does not comprise the trisodium pyrophosphate as defined in the present invention. Preferably, the pet food is a cat food.

Of course, the above-mentioned technical features recited for the palatability-enhancing composition, the pet food and the method for producing a pet food having enhanced palatability can also apply to these uses and methods.

Method for Feeding Pets

Another aspect of the present invention concerns a method for feeding a pet, preferably a cat, comprising at least:
a) providing a pet food as above described; and
b) feeding said pet food to the pet.

Method and Use for Increasing Pet Food Intake

Another aspect of the present invention concerns a method for increasing pet food intake of a pet, preferably a cat, comprising at least the steps consisting of:
a) providing a pet food as above described; and
b) feeding said pet food to the pet.

The invention also relates to the use of a palatability-enhancing composition as above described for increasing pet food intake of a pet.

The invention also relates to the use of at least one trisodium pyrophosphate as defined in the present invention, more particularly containing a crystalline phase, wherein said crystalline phase comprises a monohydrate phase and an anhydrous phase in a weight ratio monohydrate phase/anhydrous phase between 1:50 and 4:1, for increasing pet food intake of a pet.

The pet food intake is increased in particular compared to another pet food which does not comprise a palatability-enhancing composition according to the invention, in particular which does not comprise the trisodium pyrophosphate as defined in the present invention.

Of course, the above-mentioned technical features recited for the palatability-enhancing composition, the pet food and the method for producing a pet food having enhanced palatability can also apply to these uses and methods.

Kit for Enhancing Palatability of a Pet Food

Another aspect of the present invention concerns a kit for enhancing palatability of a pet food comprising at least the following components, in one or more containers in a single package:
a) a palatability-enhancing composition as above described; and
b) optionally, at least one pet food ingredient.

Another aspect of the present invention concerns a kit for preparing the palatability-enhancing composition as above described comprising at least at least one trisodium pyrophosphate as defined in the present invention.

Particular kits according to the present invention further comprise a means for communicating information or instructions, to help using the kits' elements.

The following examples are intended to illustrate the present invention without any limitation.

EXAMPLES

1. Material and Methods 1.1. Preparation of Pet Foods Comprising Palatability-Enhancing Compositions Six trisodium pyrophosphate compounds were provided (hereafter also named "TPP"), whose characteristics are described in Table 1 (see Section 1.3. regarding methods of analysis). Compounds A, E and F are according to the invention whereas Compounds B, C and D are out of the invention.

Compound B is a commercialized anhydrous trisodium pyrophosphate of the state of the art, as obtained shortly after its preparation.

Compound C is a commercialized monohydrate trisodium pyrophosphate of the state of the art, as obtained shortly after its preparation.

Inventors applied controlled conditions on Compound B in order to obtain Compounds A, D, E and F. To this end, storage temperature, humidity and time were carefully controlled to obtain the desired proportions (in particular the monohydrate phase/anhydrous phase weight ratio).

TABLE 1

| | Amorphous phase Amount *1 | Amount *1 | Crystalline phase | | Monohydrate phase/anhydrous phase weight ratio *3 |
| --- | --- | --- | --- | --- | --- |
| | | | Amount of anhydrous phase *2 | Amount of monohydrate phase *2 | |
| Compound A | 9.1% | 90.9% | 33.9% | 66.1% | 2:1 |
| Compound E | 9.0% | 91.0% | 91.0% | 9.0% | 1:10 |
| Compound F | 10.2% | 89.8% | 94.7% | 5.3% | 1:18 |
| Compound B | 1.5% | 98.5% | 100% | 0% | 0:1 |

TABLE 1-continued

| | Amorphous phase Amount *1 | Amount *1 | Crystalline phase Amount of anhydrous phase *2 | Amount of monohydrate phase *2 | Monohydrate phase/anhydrous phase weight ratio *3 |
|---|---|---|---|---|---|
| Compound C | 7.9% | 92.1% | 0% | 100% | 1:0 |
| Compound D | 18.4% | 81.6% | 2.8% | 97.2% | 35:1 |

*1 % by weight, based on the total weight of trisodium pyrophosphate
*2 % by weight, based on the total weight of crystalline phase
*3 based on the total weight of crystalline phase Palatability-enhancing compositions ("PE") were prepared by mixing one trisodium pyrophosphate compound and optionally hydrolyzed animal proteins (0.6% by weight of the kibble). The formulations of palatability-enhancing compositions are described in Table 2 below. PE1-PE6 are according to the invention whereas PE7-PE14 are out of the invention.

TABLE 2

| | Trisodium Pyrophosphate ("TPP") | | Animal source of proteins |
|---|---|---|---|
| | Type | Amount *1 | Type |
| PE1 | Compound A | 0.06% | Poultry |
| PE2 | Compound A | 0.38% | Pork |
| PE3 | Compound A | 0.38% | — |
| PE4 | Compound A | 0.7% | Pork |
| PE5 | Compound A | 0.7% | — |
| PE6 | Compound A | 0.06% | Pork |
| PE7 | Compound B | 0.06% | Poultry |
| PE8 | Compound B | 0.38% | Pork |
| PE9 | Compound C | 0.06% | Poultry |
| PE10 | Compound C | 0.38% | — |
| PE11 | Compound C | 0.38% | Pork |
| PE12 | Compound C | 0.7% | Pork |
| PE13 | Compound C | 0.7% | — |
| PE14 | Compound D | 0.06% | Pork |

*1 % by weight, based on total weight of kibble

These compositions were sprayed onto dry cat kibbles previously coated with fat (6%) ("Diet X" coated with "PE X").

1.2. Determination of Palatability with a Two-Bowl Test

Operating Method of the Test:

The palatability of two products was assessed at Panelis (France), using a two-bowl test (two short meals per day for two days) on 40 cats. Identical amounts of both products were weighed out and placed in identical bowls. The amount present in each ration enables the daily requirements to be met. If animals have higher or lower consumption compared to predetermined values (which are function of, e.g., the animal weight and/or metabolism), they are not taken into account into statistical treatment. The final intake of each food was measured. The results are shown as relative consumption ratios of A or B or C or D.

Statistical Analysis

Statistical analysis was used to determine if there was a significant difference between the 2 ratios. A Student's t-test with 3 error thresholds, namely 5%, 1% and 0.1%, was performed.

Significance Levels are Noted as Below:

| NS | not significant | ($p > 0.05$) |
|---|---|---|
| * | significant | ($p \leq 0.05$) |
| ** | highly significant | ($p \leq 0.01$) |
| *** | very highly significant | ($p \leq 0.001$) |

1.3. Analysis of Trisodium Pyrophosphate Microstructure

Crystalline Structure Identification

The crystalline structure of monohydrate crystalline phase was described in literature allowing the quantification by X-ray powder diffraction method [1].

The crystalline structure of anhydrous crystalline phase has been determined from X-ray powder diffraction using X-ray thermo diffractometrics method, using a Bruker D8 equipment under nitrogen flux and a copper radiation source. The crystalline structure of the anhydrous crystalline source was determined thanks to the Dicvol [2] program.

Quantification of Crystalline Phases

Trisodium pyrophosphates were analysed by X-ray diffraction in order to quantify the amounts of anhydrous phase and monohydrate phase. An internal standard (MgO) was used to calculate mass proportions of each identified phase. Anhydrous phase and monohydrate phase amounts were calculated from the diffraction spectrum data. The amorphous part of the products was calculated by difference.

2. Results

Tests were performed in order to compare palatability of a trisodium pyrophosphate according to the invention to trisodium pyrophosphates out of the invention, in different conditions (combination with hydrolyzed animal proteins or not, type of animal source of proteins, amount of trisodium pyrophosphate by weight of cat food).

In the Examples here below, the cat foods comprising a trisodium pyrophosphate according to the invention in a palatability-enhancing composition are "Experimental Diets", while the cat foods comprising a trisodium pyrophosphate out of the invention in a palatability-enhancing composition are "Control Diets".

2.1. Example 1

Versus tests were performed in order to compare palatability of Compound A, according to the invention, and of Compound B, out of the invention. Compound B of the state of the art does not possess any crystalline monohydrate phase.

Results are shown in Table 3.

TABLE 3

| Amount of TPP | Animal source of proteins | Cat kibble comprising Compound A according to the invention | Cat kibble comprising | Consumption ratio | | Statistical Significance |
|---|---|---|---|---|---|---|
| | | | Compound B | % A | % B | icance |
| 0.06% | Poultry | Experimental Diet 1 | Control Diet 7 | 67 | 33 | ** |
| 0.38% | Pork | Experimental Diet 2 | Control Diet 8 | 71 | 29 | *** |

These results support the better enhancing performance of the specific trisodium pyrophosphate compound as defined in the present invention, comprising both monohydrate and anhydrous phases in a specific ratio, compared to a trisodium pyrophosphate compound of the state of the art, whose crystalline phase is composed only of an anhydrous phase.

2.2. Example 2

Versus tests were performed in order to compare palatability of Compound A, according to the invention, and of Compound C, out of the invention. Compound C of the state of the art does not possess any crystalline anhydrous phase.

Results are shown in Table 4.

TABLE 4

| Amount of TPP | Animal source of proteins | Cat kibble comprising Compound A according to the invention | Cat kibble comprising | Consumption ratio | | Statistical Significance |
|---|---|---|---|---|---|---|
| | | | Compound C | % A | % C | icance |
| 0.06% | Poultry | Experimental Diet 1 | Control Diet 9 | 67 | 33 | * |
| 0.38% | Pork | Experimental Diet 2 | Control Diet 11 | 67 | 33 | *** |
| 0.38% | — | Experimental Diet 3 | Control Diet 10 | 71 | 29 | *** |
| 0.7% | Pork | Experimental Diet 4 | Control Diet 12 | 62 | 38 | * |
| 0.7% | — | Experimental Diet 5 | Control Diet 13 | 59 | 41 | * |

These results support the better enhancing performance of the specific trisodium pyrophosphate compound as defined in the present invention, comprising both monohydrate and anhydrous phases in a specific ratio, compared to a trisodium pyrophosphate compound of the state of the art, whose crystalline phase is composed only of a monohydrate phase.

2.3. Example 3

Versus tests were performed in order to compare palatability of Compound A, according to the invention, and of Compound D, out of the invention. These two Compounds both possess a crystalline anhydrous phase and a crystalline monohydrate phase in different proportions.

Results are shown in Table 5.

TABLE 5

| Amount of TPP | Animal source of proteins | Cat kibble comprising Compound A according to the invention | Cat kibble comprising | Consumption ratio | | Statistical Significance |
|---|---|---|---|---|---|---|
| | | | Compound D | % A | % D | icance |
| 0.06% | Pork | Experimental Diet 6 | Control Diet 14 | 61 | 39 | ** |

This result supports the better enhancing performance obtained thanks to the specific monohydrate and anhydrous phases ratio of the trisodium pyrophosphate as defined in the present invention.

BIBLIOGRAPHY

[1] L. S. Ivashkevich, K. A. Selevich, A. S. Lyakhov, A. F. Selevich, Y. I. Petrusevich, The crystal structure of $Na_3HP_2O_7 \cdot H_2O$ from X-ray powder diffraction data, Zeitschrift Für Kristallographie-Crystalline Materials. 217(2002), 73-77

[2] D. Loüer, A. Boultif, Some further considerations in powder diffraction pattern indexing with the dichotomy method, Powder Diffraction. 29 (2017) S7-S12

The invention claimed is:

1. A palatability-enhancing composition comprising at least one trisodium pyrophosphate containing a crystalline phase, wherein the crystalline phase comprises a monohydrate phase and an anhydrous phase in a monohydrate phase/anhydrous phase weight ratio between 1:50 and 4:1.

2. The palatability-enhancing composition of claim 1, wherein the at least one trisodium pyrophosphate is composed of at least 2% by weight or less than 20% by weight of an amorphous phase.

3. The palatability-enhancing composition of claim 1, wherein the at least one trisodium pyrophosphate is composed of at least 2% by weight and less than 20% by weight of an amorphous phase.

4. The palatability-enhancing composition of claim 1, wherein the at least one trisodium pyrophosphate contains at least 80% or less than 98% by weight of crystalline phase.

5. The palatability-enhancing composition of claim 1, wherein the at least one trisodium pyrophosphate contains at least 80% and less than 98% by weight of crystalline phase.

6. The palatability-enhancing composition of claim 1, wherein the palatability-enhancing composition comprises at least 2% by weight of trisodium pyrophosphate.

7. A pet food comprising the palatability-enhancing composition of claim 1.

8. The pet food of claim 7, wherein the at least one trisodium pyrophosphate is in an amount of at least 0.01% or less than 2% by weight of pet food.

9. The pet food of claim 7, wherein the at least one trisodium pyrophosphate is in an amount of at least 0.01% and less than 2% by weight of pet food.

10. The pet food of claim 7, wherein the palatability-enhancing composition is comprised in a coating on the pet food.

11. A method for preparing a palatability-enhancing composition comprising:
   a) providing at least one trisodium pyrophosphate as defined in claim 1;
   b) providing at least one additional ingredient;
   d) adding the at least one trisodium pyrophosphate to the at least one additional ingredient, thereby obtaining the palatability-enhancing composition.

12. The method of claim 11, wherein the at least one additional ingredient of step b) is selected from the group consisting of proteins, amino acids, sugars, fats, and yeasts.

13. The method of claim 11, wherein the method comprises a further step c) of hydrolyzing the at least one additional ingredient.

14. The method of claim 11, wherein the at least one trisodium pyrophosphate is incorporated in step d) in an amount of at least 2% by weight of palatability-enhancing composition.

15. A method for producing a pet food, wherein the method comprises:
   a) providing a pet food,
   b) adding to a pet food the palatability-enhancing composition of claim 1.

16. A method for enhancing the palatability of a pet food, wherein the method comprises:
   a) providing a pet food,
   b) adding to a pet food the palatability-enhancing composition of claim 1.

* * * * *